Patented Mar. 9, 1948

2,437,508

UNITED STATES PATENT OFFICE 2,437,508

COPOLYMERS OF MIXTURES COMPRISING ALLYL AND METHALLYL ETHER ESTERS

Gaetano F. D'Alelio, Northampton, Mass., assignor to General Electric Company, a corporation of New York No Drawing. Application June 28, 1944, Serial No. 542,600

2 Claims. (Cl. 260—78.3)

This invention relates to resinous compositions and more particularly to resinous compositions prepared by polymerizing a compound of the general formula

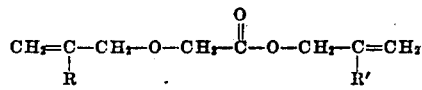

wherein R and R' are each a member of the class consisting of hydrogen and the methyl radical, alone or with another polymerizable organic compound.

In my copending application Serial No. 542,599, filed of even date herewith, now Patent No. 2,406,590, and assigned to the assignee of the present invention, I have described allyl and methallyl ether esters of the formula hereinabove represented, and have claimed in that application methods of preparing such esters. These ether esters may be polymerized alone or used as cross-linking agents for other polymerizable materials to produce castings which are free or almost entirely free of voids.

It is known that polymerizable materials such as vinyl acetate, styrene, ethyl acrylate, methyl methacrylate, acrylonitrile, etc., on polymerizing, yield thermoplastic polymers. Unless care is taken, castings of these materials may contain small voids or bubbles which may be caused by trapping of air or vapors of the monomeric material in the castings. Because the amount of scrap discard realized in castings containing these imperfections may be large, any method whereby these voids are kept to a minimum is a distinct advantage.

In many instances thermoset resinous compositions are more desirable than thermoplastic materials because of the higher softening and flow points of the former. In addition, thermoset materials exhibit the characteristics of infusibility and insolubility, which are lacking in thermoplastic materials. To illustrate the cross-linking effect of the chemical compounds described more fully in my above-mentioned copending application whereby thermoplastic, fusible and soluble resins are converted to the thermoset, infusible and insoluble state, allyl allyloxyacetate was copolymerized in castings with other polymerizable materials. The following examples are given by way of illustration and not by way of limitation. All parts are by weight.

In each of the following cases, allyl allyloxyacetate, in varying proportions, was copolymerized with ethyl acrylate, vinyl acetate, styrene, ethyl itaconate, methyl methacrylate, acrylonitrile and ethylene maleate (ethylene glycol maleate).

As catalyst, benzoyl peroxide was added to each sample in an amount equal to 1 part by weight based on the total weight of the monomers. For the purpose of comparison, each of the monomers was also polymerized without the allyl allyloxyacetate under identical conditions.

The cure cycle consisted in heating the samples at 45° C. for 72 hours, 60° C. for 48 hours, 70° C. for 24 hours, 90° C. for 24 hours, and 115° C. for 24 hours. Below is a table showing the materials used and the results.

Table

| Parts Allyl Allyloxy-acetate | Copolymerizable Monomer | Parts Copolymerizable Monomer | Results of Castings |
|---|---|---|---|
| 20 | Ethylene maleate | 80 | Light-colored, cross-linked, bubble-free resin. |
| 0 | Vinyl acetate | 100 | Bubbled, thermoplastic. |
| 1 | ___do___ | 99 | Bubble-free, thermoset, clear. |
| 10 | ___do___ | 90 | Do. |
| 20 | ___do___ | 80 | Do. |
| 0 | Ethyl itaconate | 100 | Very bubbly casting. |
| 10 | ___do___ | 90 | Bubble-free, thermoset, clear. |
| 20 | ___do___ | 80 | Do. |
| 0 | Methyl methacrylate | 100 | Bubbles, thermoplastic. |
| 10 | ___do___ | 90 | Bubble-free, thermoset, clear. |
| 20 | ___do___ | 80 | Bubble-free, thermoset, slightly cloudy. |
| 0 | Ethyl acrylate | 100 | Badly bubbled, thermoplastic. |
| 10 | ___do___ | 90 | Slightly bubbled, thermoset. |
| 20 | ___do___ | 80 | Do. |
| 0 | Styrene | 100 | Filled with bubbles, thermoplastic. |
| 1 | ___do___ | 99 | Slightly bubbled, thermoset. |
| 10 | ___do___ | 90 | Very slightly bubbled, thermoset. |
| 20 | ___do___ | 80 | Clear, thermoset. |
| 1 | Acrylonitrile | 99 | Thermoset copolymer. |
| 10 | ___do___ | 90 | Do. |
| 20 | ___do___ | 80 | Opaque, thermoset, hard copolymer. |

Any compound containing at least one polymerizable $$CH_2=C<$$

grouping in its molecular structure may be copolymerized with the allyl and methallyl ether ester derivatives. Among these copolymerizable materials are the esters, nitriles and amides of acrylic and alpha-substituted acrylic acids, and vinyl esters and halides. Other examples of polymerizable materials that may be copolymerized with the compounds described in the first paragraph of this specification are the polyhydric alcohol esters of unsaturated polycarboxylic acids, etc.

Specific examples of polymerizable compounds containing at least one $CH_2=<$ polymerizable grouping are:

Benzyl methacrylate
Benzyl acrylate
Ethyl alpha-bromacrylate
Diallyl itaconate
Methyl acrylate
Propyl alpha-chloroacrylate
Para-chlorostyrene
Allyl acrylate
Allyl methacrylate
Methallyl acrylate
Vinyl methyl ether
Vinyl ethyl ether
Divinyl ether
Diallyl ether
Dimethallyl ether
Vinylidene chloride
Ethylene dimethacrylate
Glyceryl triacrylate
Ethylene diacrylate
Diallyl phthalate
Ethylene itaconate
Glyceryl itaconate
Para-chlorobenzyl acrylate
Diallyl fumarate
Diethyl itaconate
Ethyl methacrylate
Ethyl acrylate
Divinyl benzene
Divinyl biphenyl
Chlorobenzyl acrylate
Acrylic acid
Acrylamide
Methacrylic acid
Acrylonitrile
Vinyl methyl ketone
Vinyl chloride
Butadiene-1,3
2-chloro-butadiene-1,3 (chloroprene)
2-cyano butadiene-1,3
Methacrylonitrile
Dimethallyl itaconate
Diethylene dimethacrylate
Triethylene itaconate Heat, light, or heat and light may be used to effect polymerization, although under such conditions the rate of polymerization is relatively slow. Hence, to accelerate the polymerization, I prefer to use a catalyst, accompanied by heat, light or heat and light. Examples of polymerization catalysts which may be used are ozone, ozonides, inorganic super-oxides, such as barium peroxide, sodium peroxide, etc., aliphatic acyl peroxides, e. g., acetyl peroxide, lauryl peroxide, stearyl peroxide, etc., peroxides of the aromatic or of the aliphatic-aromatic acid series, e. g., benzoyl peroxide, as used in the above examples, acetyl benzoyl peroxide, etc., various per-compounds such as perborates, persulfates, perchlorates, etc., aluminum salts, such as the halides, e. g., aluminum chloride, organic and inorganic acids such as methacrylic acid, hydrofluoric acid, etc., metal compounds of the unsaturated acids, such for instance as cobalt and manganese resinates, linoleates, maleates, etc. Benzoyl peroxide is the preferred catalyst. Any suitable amount of catalyst may be used, but in general the catalyst concentration will be within the range of 0.1 to 2.0 parts by weight of the whole. The rate of polymerization and the properties of the final product vary with the time, temperature, and if a catalyst is used, also with the catalyst concentration. Polymerization of the polymerizable compositions containing the aforementioned ether esters may be effected at from room temperature to temperature above 100° C., for example, about 130° C.; but ordinarily I use temperatures within the range of 45° C. to 120° C. in causing polymerization.

The allyl or methallyl ether esters used in practicing this invention may be polymerized alone or with a plurality of such ether esters, either with a single compound or with a plurality of compounds each containing at least one polymerizable $$CH_2=C<$$

grouping, numerous examples of which have been given above, or with an unsaturated alkyd resin, illustrative examples of which are:

Ethylene maleate (the esterification product of ethylene glycol and maleic anhydride or maleic acid)
Ethylene fumarate
Diethylene maleate (the esterification product of diethylene glycol and maleic anhydride or maleic acid)
Diethylene fumarate
Glyceryl fumarate
Glyceryl maleate
Glyceryl itaconate
Ethylene itaconate
Diethylene itaconate
Ethylene $\Delta^4$-tetrahydrophthalate
Triethylene maleate (the esterification product of triethylene glycol and maleic anhydride or maleic acid)
Ethylene 1,4 - endomethylene -$\Delta^4$- tetrahydrophthalate
Diethylene $\Delta^4$-tetrahydrophthalate
Diethylene 1,4 - endomethylene-$\Delta^4$-tetrahydrophthalate Although in the foregoing examples I have shown an interpolymerization product of a minor proportion (approximately 1 to 20 parts by weight of the whole) of an allyl ester of allyloxyacetic acid, it will be understood, of course, that the invention is not limited to these particular proportions of components nor to this particular ester. Mainly for economic reasons I prefer that the allyl and methallyl ether esters embodied in this invention do not exceed substantially 50 parts by weight of the mixed polymerizable materials, but the use of higher amounts is not precluded, for example, up to 90 to 95 parts of the whole, or the use of the pure polymerized compound itself. Although I have shown under the above examples the production of a copolymer having as little as 1 part of allyl allyloxy-acetate with 99 parts of a polymerizable compound, ordinarily in the preparation of the copolymers of this invention, I prefer that the allyl or methallyl ether esters constitute at least 5 parts by weight of the mixed starting materials. In general the proportions will be varied depending upon the particular properties desired in the interpolymer.

The interpolymerization products of this invention have a wide range of properties. Depending, for example, upon the particular allyl or methallyl ether ester used and the particular polymerizable compound, the particular proportions thereof, the conditions of polymerization (temperature, time, pressure, presence or absence of catalyst, kind of catalyst used, if any, as well as the catalyst concentration, etc.) and the extent of the interpolymerization, they vary from soft, flexible, soluble bodies to hard, rigid masses of varying resistance to solvents. In intermediate stages of copolymerization, some form fluid compositions of varying intrinsic viscosities and may be so used. For coating or impregnating applications, where the presence of a small amount of solvent in the cured composition is not objectionable, the mixed polymerizable materials may be diluted with volatile or non-volatile solvents to viscosities best adapted to meet the particular service application, and then may be copolymerized after application of the solution to the particular article to be coated or coated and impregnated. By suitable selection of the starting materials and the conditions of interpolymerization, interpolymers can be obtained in an insoluble, infusible state practically resistant to the destructive effect of other chemical bodies such as acids, bases, solvents, and the like.

The simple and mixed monomers may be converted to polymers or interpolymers in molds with or without the application of pressure, in the presence of a material which is a solvent for the monomer but not for the polymer, or one which is not a solvent for either the monomer or polymer so that spongy or granulated polymeric modifications are obtained.

These new compositions resulting from the polymerization of the allyl or methallyl ether esters employed in practicing this invention alone or with other polymerizable compounds may be used alone or with fillers, dyes, pigments, opacifiers, lubricants, plasticizers or other modifying bodies in, for example, casting, molding and laminating applications, and as adhesives, impregnants and surface-coating materials.

As modifying agents various fillers may be used, for example, wood flour, alpha cellulose in flock form, sand, powdered or flaked mica, cellulosic materials, such as cellulose itself, regenerated cellulose, cellulose ethers, sheets or cuttings of paper, cloth, canvas, etc., asbestos in powdered or long or short fiber length, short or long wooded fibers, synthetic or natural continuous threaded fibers, glass fibers in continuous filament or fabric (woven or felted) form, etc.

The modifying bodies may also take the form of high molecular weight bodies with or without resinous characteristics, for example, partially hydrolyzed wood products, lignin, proteins, protein-aldehyde condensation products, furfural condensation products, phenol-aldehyde condensation products, urea-aldehyde condensation products, aniline-aldehyde condensation products, sulfonamide-aldehyde condensation products, natural gums and resins such as copal, shellac, rosin, etc., polyvinyl formal, synthetic linear condensation superpolymers, e. g., the superpolyamides, polyhalogenated aromatic derivatives, etc.

In coating, impregnating and similar applications, the monomeric or partly polymerized materials comprising the aforementioned allyl or methallyl ether esters and other polymerizable compounds with or without added solvent, may be applied to the object to be treated and polymerized as hereinbefore described, with or without the application of pressure, to form the polymer or copolymer in situ.

These new synthetic materials may be used as impregnants for many porous bodies, such as cork, pottery, felts, or fabricated bodies with interstices, such as the windings of electrical coils, netted fibers, interwoven fibrous materials, etc. They may also be used for protectively coating impervious articles such as metals or for coating or coating and impregnating articles such as paper, wood, cloth, glass fibers in felted, woven or other form, concrete, linoleum, synthetic boards, etc. These new synthetic bodies also may be used in making laminated fibrous sheet materials wherein superimposed layers of cloth, paper, etc., are firmly bonded together with the synthetic body by the application of heat and pressure.

The simple or mixed monomers or partial polymers, with or without modifying agents, may be cast and molded under heat or under heat and pressure. The solid thermoplastic and potentially thermosetting bodies obtained by copolymerizing the allyl and methallyl ether esters with other polymerizable compounds also may be molded by injection, extrusion or compression molding technique whereby they are converted (heat- and pressure-hardened in the case of thermosetting bodies) into a variety of molded articles of manufacture for industrial, household and novelty uses.

What I claim as new and desire to secure by Letters Patent of the United States is:

1. A composition comprising the product of polymerization of a mixture comprising, by weight, (1) from 1 to 20 parts of a compound of the general formula

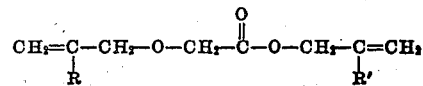

where R and R' are each a member of the class consisting of hydrogen and the methyl radical and (2) from 99 to 80 parts vinyl acetate.

2. A composition comprising an interpolymer produced by polymerization of ingredients comprising, by weight, from 1 to 20 parts allyl alyloxyacetate and from 99 to 80 parts vinyl acetate.

GAETANO F. D'ALELIO.

REFERENCES CITED

The following references are of record in the file of this patent:

UNITED STATES PATENTS

| Number | Name | Date |
|---|---|---|
| 2,221,663 | Rothrock | Nov. 12, 1940 |
| 2,273,891 | Pollack et al. | Feb. 24, 1942 |
| 2,302,618 | Loder | Nov. 17, 1942 |
| 2,386,999 | Adelson et al. | Oct. 16, 1945 |